(12) United States Patent
Berger et al.

(10) Patent No.: US 10,670,071 B2
(45) Date of Patent: Jun. 2, 2020

(54) TURBOCHARGER

(71) Applicants: Bosch Mahle Turbo Systems GmbH & Co. KG, Stuttgart (DE); Martin Berger, Oberderdingen (DE)

(72) Inventors: Martin Berger, Oberderdingen (DE); Rüdiger Kleinschmidt, Bammental (DE); Martin Kropp, Albershausen (DE); Jörg Jennes, Bockenheim (DE)

(73) Assignee: BMTS Technology GmbH & Co. KG (DE)

( * ) Notice: Subject to any disclaimer, the term of this patent is extended or adjusted under 35 U.S.C. 154(b) by 0 days.

(21) Appl. No.: 15/551,061

(22) PCT Filed: Mar. 18, 2015

(86) PCT No.: PCT/EP2015/055715
§ 371 (c)(1),
(2) Date: Aug. 15, 2017

(87) PCT Pub. No.: WO2016/146189
PCT Pub. Date: Sep. 22, 2016

(65) Prior Publication Data
US 2018/0023620 A1 Jan. 25, 2018

(51) Int. Cl.
*F16C 17/18* (2006.01)
*F16C 17/10* (2006.01)
(Continued)

(52) U.S. Cl.
CPC .............. *F16C 17/18* (2013.01); *F01D 25/16* (2013.01); *F01D 25/166* (2013.01); *F02B 37/00* (2013.01);
(Continued)

(58) Field of Classification Search
CPC ........ F16C 17/10; F16C 17/105; F16C 17/18; F16C 23/043; F16C 33/1075; F05D 2240/53; F01D 25/16; F01D 25/166
See application file for complete search history.

(56) References Cited

U.S. PATENT DOCUMENTS

| 2,710,234 A | 6/1955 | Hansen et al. |
| 3,265,452 A | 8/1966 | Pan et al. |

(Continued)

FOREIGN PATENT DOCUMENTS

| CN | 103925296 A | 7/2014 |
| DE | 2618542 A1 | 11/1977 |

(Continued)

OTHER PUBLICATIONS

PCT Search report dated Dec. 16, 2015 in PCT/EP2015/055715, 13 pp. (not prior art).

(Continued)

*Primary Examiner* — James Pilkington
(74) *Attorney, Agent, or Firm* — Lucian Wayne Beavers; Patterson Intellectual Property Law, PC

(57) ABSTRACT

The invention relates to an exhaust-gas-driven turbocharger having a hydrodynamic plain bearing having a rotor and a stator, the rotor being rotatable with respect to the stator, the rotor bearing surface being located opposite a counter-surface of the stator in order to generate hydrodynamic pressure in the region of a converging gap. In such a hydrodynamic plain bearing, the application properties can be improved by the fact that the rotor bearing surface and/or the counter-surface constitutes in a section view, in the context of a section along and through the rotation axis, a continuous bearing contour that is constituted from convex or concave curvatures and/or from at least two contour segments that are embodied as straight lines and/or curva- (Continued)

tures. The invention also relates to a hydrodynamic plain bearing or bearing arrangement having such a plain bearing.

20 Claims, 11 Drawing Sheets

(51) Int. Cl.
  F16C 33/10 (2006.01)
  F01D 25/16 (2006.01)
  F02B 37/00 (2006.01)
(52) U.S. Cl.
  CPC ........... *F16C 17/10* (2013.01); *F16C 17/105* (2013.01); *F16C 33/1075* (2013.01); *F05D 2220/40* (2013.01); *F05D 2240/53* (2013.01); *F05D 2250/323* (2013.01); *F05D 2250/36* (2013.01); *F05D 2250/711* (2013.01); *F05D 2260/30* (2013.01); *F16C 2202/08* (2013.01); *F16C 2202/22* (2013.01); *F16C 2360/24* (2013.01); *Y02T 10/144* (2013.01)

(56) References Cited

U.S. PATENT DOCUMENTS

| | | | | |
|---|---|---|---|---|
| 3,447,841 | A | | 6/1969 | Fernlund |
| 3,578,828 | A | * | 5/1971 | Orkin ............... F16C 17/10 384/129 |
| 5,054,940 | A | * | 10/1991 | Momose ............ F16C 17/10 384/192 |
| 5,518,319 | A | | 5/1996 | Selby |
| 5,789,839 | A | * | 8/1998 | Langenbeck ........ F16C 17/105 310/67 R |
| 5,957,587 | A | | 9/1999 | Hong et al. |
| 5,971,615 | A | * | 10/1999 | Choi ............... F16C 17/10 384/100 |
| 6,664,685 | B2 | | 12/2003 | Ameen et al. |
| 6,776,529 | B2 | | 8/2004 | Khan et al. |
| 6,799,893 | B2 | * | 10/2004 | Hokkirigawa ........ F16C 17/10 384/271 |
| 9,366,263 | B2 | | 6/2016 | Tamaoka et al. |
| 9,790,812 | B2 | * | 10/2017 | Ryu ............... F16C 17/10 |
| 2007/0104400 | A1 | | 5/2007 | Ito et al. |

FOREIGN PATENT DOCUMENTS

| | | |
|---|---|---|
| DE | 4217268 C2 | 1/1995 |
| DE | 10028984 C2 | 9/2002 |
| DE | 10261869 A1 | 8/2004 |
| DE | 102008059598 A1 | 6/2010 |
| DE | 102013110409 A1 | 3/2015 |
| EP | 209808 A2 | 1/1987 |
| EP | 780586 A1 | 6/1997 |
| EP | 1482189 A1 | 12/2004 |
| EP | 1972759 A2 | 9/2008 |
| JP | 5594914 U | 7/1980 |
| JP | 02176214 A | 7/1990 |
| JP | 09032849 A | 2/1997 |
| JP | 10068416 A | 3/1998 |
| JP | 10078029 A | 3/1998 |
| WO | 0154613 A2 | 8/2001 |
| WO | 2014105377 A1 | 7/2014 |

OTHER PUBLICATIONS

Co-pending U.S. Appl. No. 15/678,463, filed Aug. 16, 2017, 31 pp. (not prior art).
DIN 31 652 Part 1 (16 pages) (Apr. 1983).
DIN 31 652 Part 2 (19 pages) (Feb. 1983).
DIN 31 653 Part 1 (16 pages) (May 1991).
DIN 31 653 Part 2 (8 pages) (May 1991).
DIN 31 653 Part 3 (3 pages) (Jun. 1991).
DIN 31 654 Part 1.
DIN 31 654 Part 2.
DIN 31 654 Part 3.
VDI 2204 Part 1 (33 pages) (Sep. 1992).
VDI 2204 Part 2 (36 pages) (Sep. 1992).
VDI 2204 Part 3 (34 pages) (Sep. 1992).
VDI 2204 Part 4 (16 pages) (Sep. 1992).
Office action dated Nov. 9, 2018 from co-pending U.S. Appl. No. 15/678,463 (not prior art).
English machine translation of DE 102013110409 (not prior art).
Office action dated Oct. 16, 2014 in DE 10 2013 110 409 (not prior art).
English machine translation of the Office action dated Oct. 16, 2014 in DE 10 2013 110 409 (not prior art).
Office action in China Application 201580077957.0 (not prior art).
Search report in China Application 201580077957.0 (not prior art).
English translation of Korea 1020177025861 first office action (not prior art).
English translation of Korea 1020177025861 2nd office action (not prior art).
Office action in China Application 201710812509 (not prior art).
Search report in China Application 201710812509 (not prior art).

* cited by examiner

TURBOCHARGER

The invention relates to an exhaust-gas-driven turbocharger having a hydrodynamic plain bearing having a rotor and a stator, the rotor being rotatable with respect to the stator, a rotor bearing surface being located opposite a counter-surface of the stator in order to generate hydrodynamic pressure in the region of a converging gap.

The invention further relates to a bearing arrangement having a hydrodynamic plain bearing.

Lastly, the invention relates to a hydrodynamic plain bearing.

Rotating machine elements, for example shafts, track rollers, gear wheels, or pump wheels, require guidance in a radial and axial direction so that forces and torques can be transferred. This task can be taken on by plain bearings that act hydrodynamically. The functionality of this type of bearing is based on the physical principle of hydrodynamic pressure generation. In hydrodynamic plain bearings, a suitable lubricant is held between the rotor and the stator. Upon a rotational motion of the rotor relative to the stator, shear forces are produced in the lubricant and then transport it at a specific speed through the bearing. With a converging bearing gap the result thereof is a hydrodynamic pressure rise; with a diverging gap profile following the converging bearing gap, the result is a pressure drop. If the relative velocity between the rotor and stator is sufficiently high, the result of the hydrodynamic pressure is to build up a lubricant layer that is sufficiently thick to separate the two sliding partners from one another. In this operating state, friction occurs in the lubricant layer (fluid friction). The hydrodynamic pressures thereby generated, in combination with the surface area being used, maintain an equilibrium with the external forces and describe the load capacity of the plain bearing. No additional energy, in the form of compression work or a lubricant volume that is delivered at a specific pressure via grooves or pockets, is needed in order to generate the hydrodynamic pressure. The load capacity is determined by the operating variables. The fundamentals of the numerical calculation of hydrodynamic pressure are presented in DIN 31562 Part 1 (DIN handbook 198; Plain bearings 2; Beuth Verlag GmbH; Berlin, Cologne 1991).

Two basic bearing types are found in the existing art:
1. Hydrodynamic Radial Plain Bearings Hydrodynamic radial plain bearings are often embodied in the form of cylindrical sleeves as a pad-type variant, or as tilting pad bearings (see DIN 31562 Part 2 and VDI Guidelines 2204). The hydrodynamically effective elements (e.g. pads) of the plain bearing are cylindrical, and thus arranged parallel to the rotation axis. The converging gap profile results from the eccentric location of the rotor with respect to the stator.

2. Hydrodynamic Axial Plain Bearing

Hydrodynamic axial plain bearings are embodied in the form of a thrust washer having a variety of grooves or surface modifications in the form of dynamic pressure edges, wedge surfaces, or spiral grooves. They can also be configured as so-called "tilting pad" bearings (see DIN 31563 Parts 1 to 3; DIN 31564 Parts 1 to 3). The axial plain bearing is arranged orthogonally to the rotation axis, with an (as a rule) rotating thrust collar as a counter-member. The converging gap profile required in order to generate hydrodynamic pressure is produced by the conformation of the surface structures (pockets, ramps, etc.), by the inclination of the tiltably movable pads, or by an angular offset between the bearing and the thrust collar.

If both radial and axial loads occur in a technical solution, both of the aforementioned bearing types must then be used. The axial loads are then carried by an axial plain bearing, and the radial loads by the radial plain bearing. One such solution is described in DE 4217268 C2. The two bearing types must then each be calculated and designed separately from one another, resulting in correspondingly high costs for both design and production.

Hydrostatic plain bearings that are correspondingly designed are therefore often used for such load situations. It is necessary in this context to use a pressure pump that, as mentioned earlier, has a constant energy demand. Solutions of this kind are described in the document U.S. Pat. No. 2,710,234 A.

A further possibility is to introduce so-called spiral grooves into the rotor bearing surface in order thereby to generate a pressure buildup. Such solutions are described in the document U.S. Pat. No. 3,265,452 A. Grooves of this kind entail additional production outlay.

A further possibility for supporting both radial and axial loads is to use so-called spherical bearings or pivoting bearings (EP 1482189A1) or ball joints (DE10028984C2). These are not designed, however, for continuously high sliding speeds due to rotation of the counter-element (rotor) around its axis. The purpose of such bearings is instead to support a shaft offset in a tiltably movable or compensating manner. Swivel bearings as known, for example, from hydraulic cylinders are known in this context. Prosthetic hip joints, for example in accordance with WO0154613A2, perform the same function.

DE 10 2008 059 598 A1 discloses an exhaust-gas-driven turbocharger. It comprises a shaft that carries a turbine wheel and a compressor wheel at its respective ends. The shaft is journaled in a housing by means of two hydrodynamic plain bearings that are embodied in the form of taper bearings.

A further exhaust-gas-driven turbocharger is described in WO 2014/105377 A1.

The object of the invention is to furnish an exhaust-gas-driven turbocharger and a hydrodynamic plain bearing or bearing arrangement, improved utilization properties being achieved.

This object is achieved in that the rotor bearing surface of the rotor and/or the counter-surface of the stator constitutes in a section view, in the context of a section along and through the rotation axis, a continuous bearing contour that is constituted from at least two contour segments that are embodied as straight lines and/or curvatures.

Alternatively, provision can also be made that the rotor bearing surface and/or the counter-surface are convexly and/or concavely curved in order to generate hydrodynamic load capacities in both a radial and an axial direction.

According to the present invention it is consequently possible to generate, with the continuous bearing contour varying in cross section, pressure regions in the converging gap that support both the axial and the radial loads. Three-dimensional hydrodynamic load capacities are thereby produced in one hydrodynamic plain bearing. The invention utilizes the physical effect whereby the locally generated hydrodynamic pressure acts normally to a surface. Local load capacities result therefrom. If the basis is then, according to the invention, a surface that is configured three-dimensionally, local force components having corresponding directions are produced thereby. From the integral sum of the individual force components, the load capacity components of the bearing, and thus the three-dimensional load capacity, can be calculated and can be designed for the particular application instance.

Because both axial and radial loads can now be supported in a single hydrodynamic plain bearing, only one machine element is designed and produced for the bearing tasks that need to be performed. The result is an appreciable reduction in outlay for parts and assembly. Thanks to the use of hydrodynamic pressure generation, it is possible to dispense with the delivery of external energy, for example using a pump to generate hydrostatic pressure. This lowers both design and manufacturing costs, and operating costs. Because one continuous bearing contour is constituted from several contour segments, and because the rotor bearing surface or counter-surface is convexly or concavely curved, one or more converging gaps, and thus axial and radial load capacities, are produced. The vector sum thereof is greater than the load capacity of comparable bearing arrangements in which an axial bearing is combined with a radial bearing and they are used separately to generate a load capacity. The consequence of this is that a higher power density can be generated in a smaller space with the hydrodynamic plain bearings according to the present invention. The material requirement for the bearing arrangement is also thereby decreased.

According to a preferred variant of the invention, provision can be made that the rotor bearing surface and the counter-surface comprise or constitute a multiple-surface plain bearing, tilting pad bearing, floating sleeve bearing, or cylindrical plain bearing.

According to a further preferred variant of the invention, provision can be made that the conformation of the rotor bearing surface deviates from the conformation of the counter-surface of the stator in such a way that the rotor bearing surface and the counter-surface do not abut in planar contact against one another, in particular do not abut in full-coverage fashion against one another. This can happen, for example, if the rotor and stator come to a hard stop. This prevents the existence of a geometry that cannot generate hydrodynamic pressure, with the result that startup of the bearing would be difficult or impossible without assisting measures.

One conceivable variant of the invention is such that elevations shaped on, in particular, in one-piece fashion project from the rotor bearing surface and/or from the counter-surface. With the elevations, in the context of a corresponding conformation it is also possible to bring about, for example, the effect above whereby the rotor bearing surface and the counter-surface do not abut in full-coverage fashion against one another. In addition, with the elevations the hydrodynamically effective gap profile can be adapted and the operating behavior of the hydrodynamic bearing can be adjusted. For example, local deformations can be produced for that purpose in the region of the rotor bearing surface or the counter-surface. These deformations can be brought about by reshaping as a result of locally generated compressive stresses. The elevations should advantageously be smaller than the radial bearing clearance.

A hydrodynamic plain bearing according to the present invention can also be such that the rotor bearing surface and/or the counter-surface comprises regions having different coefficients of thermal expansion. With this feature the gap profile can be influenced as a function of the temperature existing at the bearing, thereby yielding a change in the load-carrying behavior of the hydrodynamic plain bearing. Provision can be made, for example, for a utilization case in which the overall bearing load capacity, or only one force component, for example the axial load capacity, is increased in targeted fashion upon an increase in temperature. The coefficients of thermal expansion can be combined with one another in such a way that elevations/depressions occur upon temperature changes in those regions, by way of which, for example, the behavior of the bearing can also be adapted to operating conditions.

Additionally or alternatively, provision can also be made for this purpose that the rotor bearing surface and/or the counter-surface exhibit regions having a different modulus of elasticity. The consequence of this is that changes in the geometry of the rotor bearing surface or the counter-surface are produced in the gap upon a change in the prevailing pressure in the lubricant. The load capacity of the bearing is then influenced thereby. It is also conceivable to adapt the bearing behavior to operating conditions by the fact that recesses, holes, or the like are provided in the rotor bearing surface or in the counter-surface. Zones of differing thermal expansion or elasticity can be constituted in this way as well.

According to one conceivable variant of the invention, provision can be made that the rotor bearing surface or the counter-surface comprises two contour segments that delimit the rotor bearing surface or the counter-surface in the direction of the rotation axis; and that one or more further contour segments are arranged between those contour segments in order to constitute the continuous bearing contour. It is thereby possible to implement a bearing design for almost any load situation. It is furthermore conceivable for the rotor bearing surface and/or the counter-surface to exhibit a convex and a concave contour segment which are transitioned into one another directly, or indirectly via a further contour segment. The combined convex and concave contour segments allow the constitution of harmonious transitions in the bearing contour, enabling a bearing conformation in which a high degree of adaptability to changing bearing loads and/or load directions during operation is possible.

Provision can be made in the context of the invention that the rotor bearing surface is constituted at least partly by a rotor part connected nonrotatably to the rotor. This has the advantage that the rotor bearing surface can be produced in very accurately fitting fashion. It is furthermore possible to adapt a rotor having the separate rotor part individually and in kit-like fashion to the particular bearing task.

A plain bearing according to the present invention can be such that the rotor comprises a deflector, associated with the plain bearing, that is arranged in the region of a lubricant outlet of the plain bearing. The lubricant guided in the plain bearing can be discharged by means of the deflector, being spun off via the periphery of the rotating deflector. It can then also, in particular, be spun toward a surface that is cooled with the lubricant; this offers an additional advantage, for example, for high-temperature applications that also occur with turbochargers.

One conceivable inventive alternative provides that a lubricant supply system is provided, lubricant being conveyable to a supply line via a lubricant conduit; that the supply line is in physical communication with the converging gap; and that the supply line is constituted between the rotor and the stator; or that the supply line extends through the stator to the gap region. Bearing arrangements of compact construction can thereby be created.

If the supply line is constituted between the rotor and the stator, a reliable and uniform lubricant supply can then be ensured in particular at high rotation speeds. A particularly effectively operating bearing arrangement becomes possible when provision is made that the supply line extends between the rotor and stator into the gap region between the rotor and stator, preferably in the form of a groove-like recess in the stator.

The object of the invention is also achieved with a bearing arrangement, the rotor comprising two bearing locations arranged spaced apart from one another in a rotor axis direction, and at least one of the bearing locations being constituted by a hydrodynamic plain bearing according to one of claims 1 to 12.

Provision can be made in particular that the stator is constituted by a housing insert that constitutes or carries the counter-surfaces, arranged with a spacing from one another in an axial direction, of the two hydrodynamic plain bearings. The outlay for parts and assembly is thereby decreased. In addition, the stators of the two bearing locations can be matched in accurately fitting fashion to one another.

A bearing arrangement can also be such that the stator comprises two extensions that constitute the contour segments, the extensions being connected directly or indirectly via a center piece. The bearing distance between the two bearing locations can be defined using the center piece. The center piece can also perform additional functions; for example, it is conceivable for the center piece to comprise guidance conduits for supplying lubricant to both bearing locations.

According to the present invention, both bearing locations can be equipped with the hydrodynamic three-dimensional plain bearings according to the present invention. It is also possible, however, to use only one. The other can then preferably be embodied as a hydrodynamic radial bearing.

The invention will be explained below in further detail with reference to exemplifying embodiments depicted in the drawings, in which.

Figure 1:
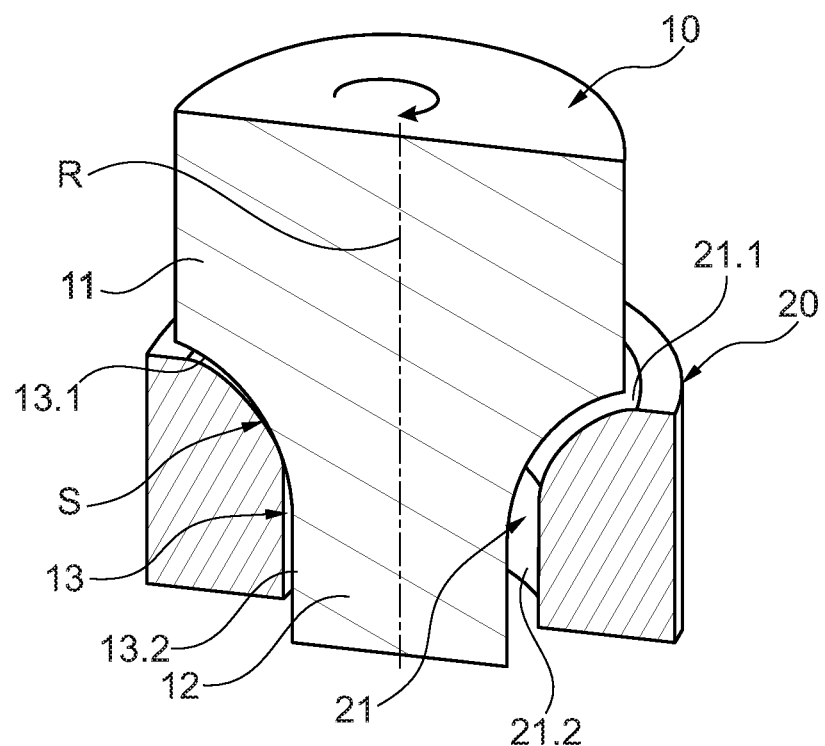
FIG. 1 is a section view schematically depicting a hydrodynamic plain bearing having a rotor and a stator.

FIG. 1 shows a hydrodynamic plain bearing having a rotor 10 and a stator 20, a sectioned depiction along rotor axis R of rotor 10 being selected. Rotor 10 possesses an attachment piece 11 onto which a bearing segment 12 is attached. A machine component, for example a gear or the like, can be indirectly or directly coupled onto attachment piece 11. Bearing segment 12 possesses an, in particular, rotationally symmetrical rotor bearing surface 13. The rotor bearing surface constitutes a continuous bearing contour. This bearing contour is constituted by two contour segments 13.1 and 13.2, in such a way that the bearing contour is continuous. The distance of the bearing contour from the rotation axis can consequently vary along the rotation axis (longitudinal center axis) in the context of the invention.

In particular, as shown in FIG. 1, in the present exemplifying embodiment the bearing contour is continuously differentiable. With continuously differentiable bearing contours, in particular, a simple numerical bearing calculation is possible, and load capacities over the entire bearing contour are possible. Counter-surface 21 can likewise be rotationally symmetrical.

Stator 20 is configured with a receptacle for rotor 10. It comprises a counter-surface 21. This counter-surface 21 constitutes a bearing contour that is generated by a convex curvature and a hollow-cylindrical region. The convex curvature and the hollow-cylindrical region constitute contour segments 21.1 and 21.2. Counter-surface 21 likewise constitutes a continuous bearing contour and, like rotor bearing surface 13, is continuously differentiable.

In the context of the invention, stator 20 is arranged in such a way that a relative velocity between rotor 10 and stator 20 can be achieved in order to generate hydrodynamic pressure. Stator 20 can installed in stationary fashion or can also be embodied rotatably, for example as a floating sleeve.

When the hydrodynamic plain bearing is in the assembled state, rotor bearing surface 13 is located opposite counter-surface 21. As is evident from FIG. 1, the bearing contour of rotor bearing surface 13 can deviate slightly from the bearing contour of counter-surface 21. This is generated using different curvatures for contour segments 13.1 and 13.2. This measure prevents bearing surface 13 and counter-surface 21 from resting in planar fashion, in particular with full coverage, against one another, in such a way that the geometry present is one that cannot generate a hydrodynamic pressure.

FIG. 1 is a symbolic operating depiction of the hydrodynamic plain bearing, in which a gap S converging in an axial and radial direction is produced by the eccentric location of rotor 10 with respect to stator 20 in the left illustration. The lubricant guided between rotor bearing surface 13 and counter-surface 21 generates, in the region of the converging gap, a pressure that determines the load capacity of the hydrodynamic plain bearing. The pressure acts at every point normally to rotor bearing surface 13 and to counter-surface 21. Force components acting both axially and radially with respect to rotation axis R are thereby produced. The integral sum of those force components determines the load capacity of the bearing in both the axial direction and the radial direction.

Figure 2:
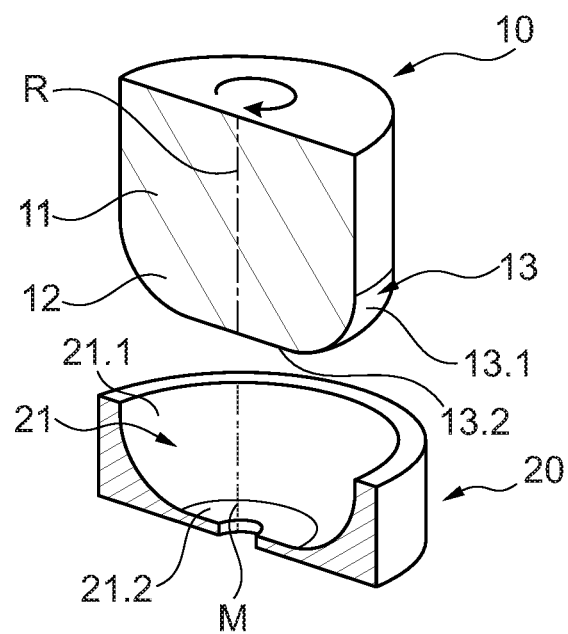
FIG. 2 is a section view showing a further alternative embodiment of a hydrodynamic plain bearing.

FIG. 2 shows a further variant embodiment of a hydrodynamic plain bearing according to the present invention, rotor bearing surface 13 being constituted by two contour segments 13.1 and 13.2, namely by a convex curvature and by a plane surface perpendicular to the longitudinal center axis. Counter-surface 21 has a corresponding contour (contour segments 21.1, 21.2).

Figure 3:
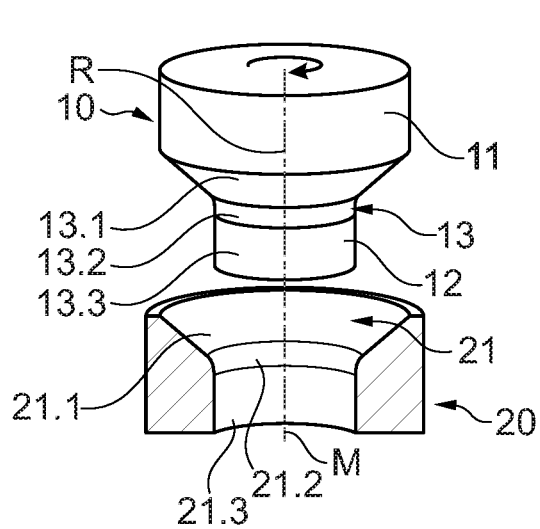
FIGS. 3 to 6 show further alternative variant embodiments of a hydrodynamic plain bearing, the stator being depicted in section.

FIG. 3 shows a further embodiment of a hydrodynamic plain bearing according to the present invention. Rotor 10 here possesses a rotor bearing surface 13 having three contour segments 13.1, 13.2, and 13.3. Contour segment 13.1 is constituted by a truncated cone. Contour segment 13.3 is of cylindrical configuration. The transition region between contour segments 13.1 and 13.3 is constituted by a contour segment 13.2 that is embodied as a concave curvature. The conformation is such that contour segments 13.1 and 13.3 transition continuously into one another. Bearing contour 13 is thus continuously differentiable in the direction of rotation axis R.

Counter-surface 21 of stator 20 is correspondingly made up of three contour segments 21.1 to 21.3. Contour segment 21.1 is embodied as a conical receptacle. Adjoining that contour segment 21.1 is contour segment 21.2 constituting a convex curvature. This convex curvature transitions into contour segment 21.3 that is embodied as a hollow cylinder. In the assembled state, contour segments 13.1 and 21.1, 13.2 and 21.2, and 13.3 and 21.3 are respectively located opposite one another. With contour segments 13.3 and 21.3, only bearing forces in a radial direction are generated as a result of the cylindrical configuration. Contour segments 13.1 and 13.2, and 21.1 and 21.2, on the other hand, generate force components in both a radial direction and an axial direction.

Figure 4:
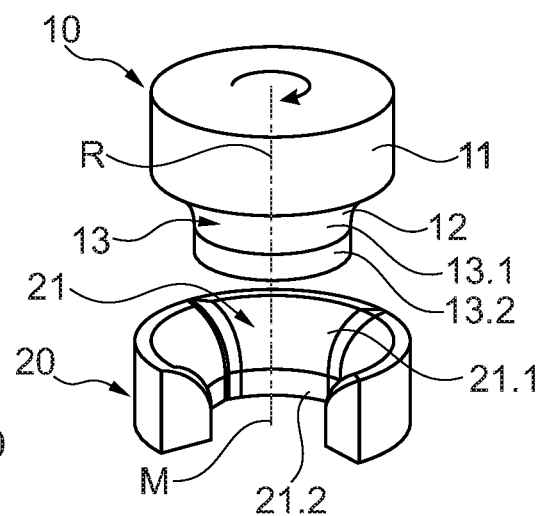

FIG. 4 shows a multi-surface or pad-type hydrodynamic plain bearing in which rotor bearing surface 13 is made up continuously of two contour segments 13.1 and 13.2. Contour segment 13.1 is embodied as a concave curvature, adjoining which is cylindrical contour segment 13.2. Counter-surface 21 of stator 20 is correspondingly constituted with two contour segments 21.1 and 21.2. Contour segment 21.1 is embodied as a convex curvature. Adjoining this contour segment 21.1 is contour segment 21.2 in the form of a hollow cylinder. Here again, only forces in a radial direction are generated in the region of contour segments 13.2 and 21.2. In the region of contour segments 13.1 and 21.1, both axial and radial force components are generated in the converging gap S.

Figure 5:
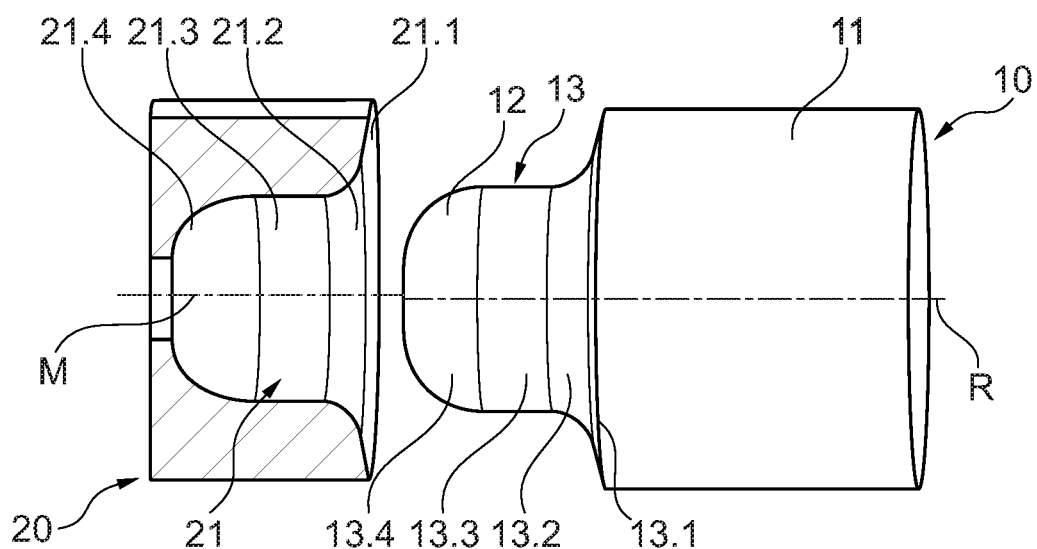

FIG. 5 shows a conformation of a hydrodynamic plain bearing according to the present invention in which rotor bearing surface 13 is made up continuously of four contour segments 13.1 to 13.4. Contour segment 13.1 is embodied as a truncated cone having a relatively large opening angle. Contour segment 13.2 adjoins, in the form of a concave curvature. Directly adjoining contour segment 13.2 is contour segment 13.3 in the form of a cylinder. Contour segment 13.3 transitions into contour segment 13.4, which is embodied as a convex curvature. Stator 20 comprises a counter-surface 21 having four contour segments 21.1 and 21.4. Contour segment 21.1 constitutes a conical receptacle that transitions into a convex curvature that is constituted by contour segment 21.2. Adjoining contour segment 21.2 is contour segment 21.3 in the form of a hollow-cylindrical receptacle. Counter-surface 21 ends with contour segment 21.4 in the shape of a concave curvature. In the assembled state and in operation, the hydrodynamic plain bearing depicted in FIG. 5 generates radial force components in the region of the oppositely located contour segments 13.3 and 21.3. The associated contour segments 13.1, 13.2, 13.4, 21.1, 21.2, and 21.4, on the other hand, generate both radial and axial force components.

During operation of the hydrodynamic plain bearings in accordance with FIGS. 1 to 5 or the hydrodynamic plain bearings according to the present invention, the external force acting on the hydrodynamic plain bearing can vary in terms of its magnitude and direction. The relationship of rotation axis R of rotor 10 to longitudinal center axis M of stator 20 also changes as a result of such a variation. The change can be both an angular offset between rotor axis R and longitudinal center axis M, and a radial offset or an axial offset. It is conceivable in particular for all the types of offset to occur simultaneously. The hydrodynamic plain bearing according to the present invention can react to such a change. Upon such a shift of rotor 10 with respect to stator 20, the location and geometry of converging gap S changes. A change in converging gap S results in a change in the force components in converging gap S which determine the load capacity of the hydrodynamic plain bearing. If an elevated axial force acts on rotor 10 in the context of the hydrodynamic plain bearing of FIG. 5, for example, the converging gap then changes in the region of contour segments 13.1, 13.2, 13.4 and 31.1, 21.2, and 21.4. Because of this change in the geometry of the hydrodynamic gap, higher pressures are attained in those regions and result in an increase in axial load capacity. The axial force that is being applied can thus be compensated for. Similar effects occur when radial loads change, or upon a shift of rotation axis R with respect to longitudinal center axis M.

Figure 6:
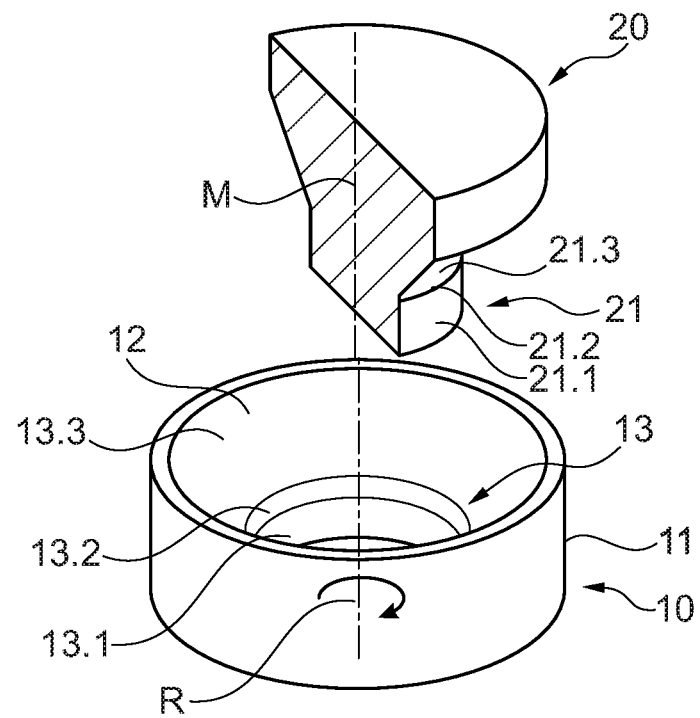

FIG. 6 shows a plain bearing in accordance with FIG. 3, but in which stator 20 and rotor 10 have now been transposed.

Figure 7:
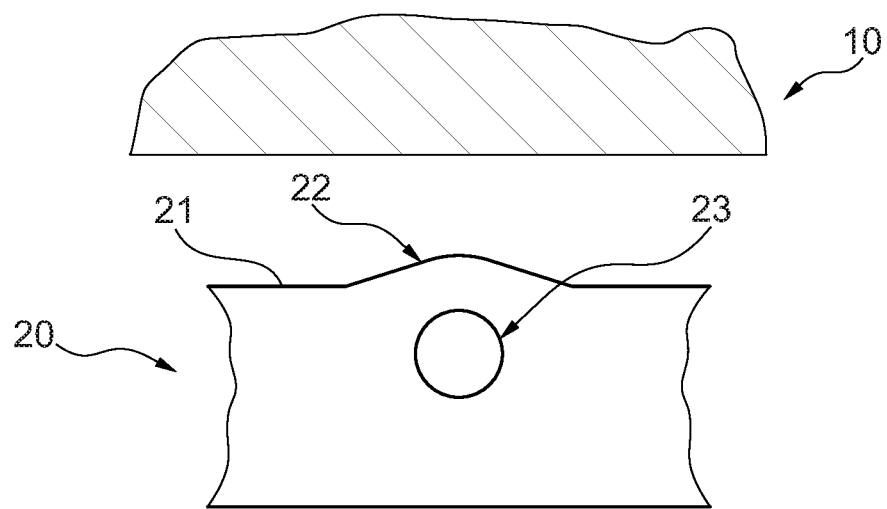
FIG. 7 is an enlarged view of a detail of a stator.

FIG. 7 is a detail depiction of a region of rotor 10 and of stator 20. The sub-region of stator 20 shown in FIG. 7 is, for example, part of contour segment 21 in accordance with FIGS. 1 to 6. As is evident from FIG. 7, an orifice 23 or similar aperture is introduced into stator 20. This orifice or aperture 23 preferably passes into the region of converging gap S. If a pressure is then generated in the orifice or aperture 23, for example by driving in a rod, a plastic or elastic deformation that constitutes an elevation 22 is then produced on the bearing contour, in particular in the region of the hydrodynamically effective gap S. The surface of counter-surface 21 is therefore correspondingly deformed in controlled fashion. The contour of elevation 22 can be influenced in controlled fashion depending on the geometry of orifice or aperture 23, and on the pressure. The gap profile, and thus the generation of hydrodynamic pressure in particular in converging gap S, can be influenced in targeted fashion by means of elevation 22. A further individual adaptation of the hydrodynamic plain bearing to the bearing task at hand can be effected with this feature. Elevation 22 can of course also be produced on rotor 10. It is also possible to provide several elevations 22 on rotor 10 and/or stator 20.

In the context of the invention it is furthermore possible to modify the pressure generation in converging gap S such that in the region of hydrodynamic gap S, rotor bearing surface 13 and/or counter-surface 21 can have regions having a different coefficient of thermal expansion and/or a different modulus of elasticity. For this, rotor bearing surface 13 and/or counter-surface 21 can have zones having different materials. For example, an aperture, in particular an orifice, which is introduced into rotor 10 and/or into stator 20, can be provided in the region of converging gap S. This aperture can then be filled with a material that has a coefficient of thermal expansion, and/or a modulus of elasticity, which is different from the surrounding material of rotor 10 or of stator 20. For example, a resin material that terminates flush with rotor bearing surface 13 or with counter-surface 21 can be introduced into the recess. It is also conceivable for rotor bearing surface 13 and/or counter-surface 21 to comprise regions having a different coefficient of thermal expansion; in particular, provision can be made that a sub-element, made in particular of ceramic oxide or of another element that has a lower coefficient of thermal expansion than that region of the rotor bearing surface and/or of the counter-surface which indirectly or directly adjoins the sub-element, in the rotor bearing surface and/or in the counter-surface. Examples of a sub-element of this kind are zirconium tungstate, silicon, titanium, steel/iron. Rotor bearing surface 13 and/or counter-surface 21 can be constituted, for example, at least partly from a bronze material, for example having a coefficient of thermal expansion of approx. $18^{-6}K^{-1}$.

FIGS. 8 to 11 show various variant embodiments of exhaust-gas-driven turbochargers according to the present invention in which the above-described hydrodynamic plain bearings according to the present invention are utilized.

Figure 8:
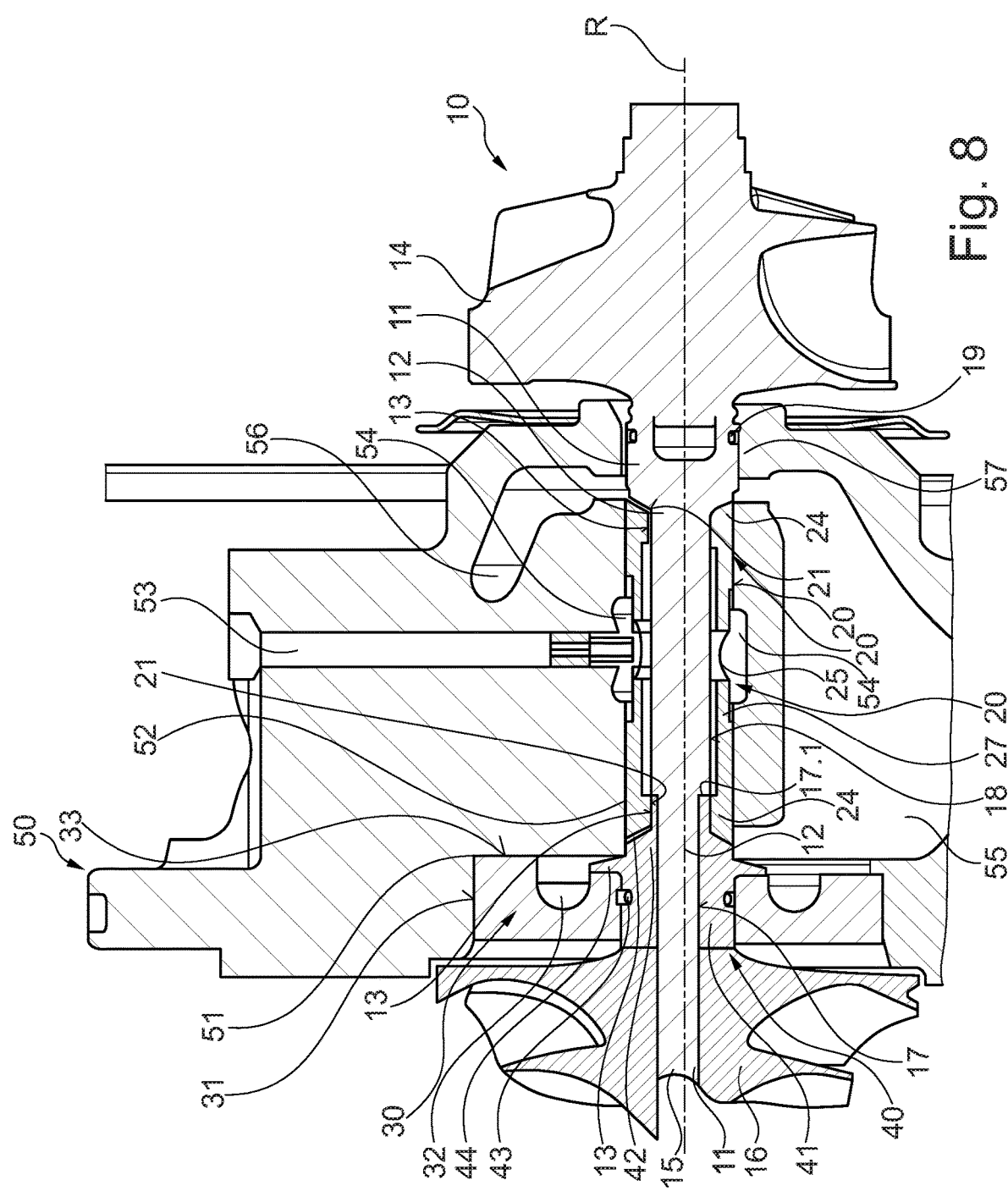
FIGS. 8 to 11 are side views, in section, of various variant embodiments of exhaust-gas-driven turbochargers having hydrodynamic plain bearings.

As FIG. 8 shows, the exhaust-gas-driven turbocharger comprises a rotor 10. Rotor 10 possesses a shaft 15 that comprises attachment pieces 11 at its shaft ends. The one attachment piece 11 carries a turbine wheel 14, the other attachment piece 11 a compressor wheel 16.

Rotor 10 comprises two bearing segments 12 that are arranged spaced away from one another in the axial direction of shaft 15. Rotor bearing surfaces 13 are constituted in the region of bearing segments 12. In the context of the invention, rotor bearing surfaces 13 can be embodied integrally with shaft 15, but it is also conceivable for rotor bearing surface 13 to be constituted by a bearing piece connected, in particular nonrotatably, to shaft 15. In the case of the exhaust-gas-driven turbocharger depicted in FIG. 8, for example, rotor bearing surface 13 that is associated with turbine wheel 14 is embodied integrally on shaft 15. The left-side bearing segment 12 is constituted by a rotor part 40 that is connected nonrotatably to shaft 15. Rotor part 40 comprises a base part 41 that is penetrated by a receptacle. Rotor part 40 can be slid, with that receptacle, onto a seating surface 17 of shaft 15. The sliding-on motion can be limited by a shoulder 17.1 of shaft 15, against which rotor part 40 comes to a stop axially. Preferably rotor part 40 is axially secured on shaft 15 by means of a tight fit. Rotor part 40 comprises a bearing segment 42 that is shaped integrally onto base part 41. Bearing segment 42 constitutes rotor bearing surface 13 of the left-side bearing segment 12.

Provision can be made in the context of the invention that a rotor bearing surface 13 is not constituted only by shaft 15 or by rotor part 40. Instead, a rotor bearing surface 13 that extends both over part of shaft 15 and over part of rotor part 40 can also be provided.

Rotor part 40 can furthermore comprise a circumferential seal receptacle 43, for example in the form of a circumferential groove and a deflector 44.

Rotor 10 is held in a housing 50, preferably in the receiving housing of the exhaust-gas-driven turbocharger. Housing 50 is penetrated by a bearing receptacle 52. A stator 20 is inserted into this bearing receptacle 52. As FIG. 8 shows, stator 20 can be embodied as a sleeve-shaped insert. Stator 20 comprises extensions 24 on its long-side ends. The radial outer surfaces of extensions 24 can be of substantially cylindrical configuration. Extensions 24 constitute contour segments 21.1 to 21.4 that are located opposite contour segments 13.1 to 13.3 of rotor bearing surfaces 13. According to the present invention rotor bearing surface 13 and counter-surface 21 of stator 20 can correspondingly be embodied as continuous bearing contours, as mentioned above, in order to bring about axial and/or radial load capacities over the entire bearing contour.

The two extensions 24 are integrally connected to one another via a center piece 27.

For assembly, rotor 10 with turbine wheel 14 installed is slid into housing 50 from right to left in the drawing plane of FIG. 8, stator 20 being pre-installed in stationary fashion in housing 50. Shaft 15 is correspondingly slid through stator 20 until rotor bearing surface 13 of the right-side bearing segment 12 is located opposite counter-surface 21 of stator 20. As rotor 10 is slid in, a seal placed into a circumferential seal receptacle 19 then also travels into the region of a sealing surface of housing 50. Rotor part 40 can then be slid onto shaft 15 from the left side until it comes to a stop against shoulder 17.1. Rotor bearing surface 13 of rotor part 40 is then located opposite the left-side counter-surface 21 of stator 20. A seal can be placed into the circumferential seal receptacle 43 of rotor part 40. A bearing piece 30 is then slid over rotor part 40. Bearing piece 30 can be embodied in the form of a cover. It is inserted, sealed at a peripheral surface 31, into an aperture 51 of housing 50. Accurately fitted installation of bearing piece 30 is ensured with a stop 33 of bearing piece 30 that abuts against a counter-surface of housing 50 in the installed state. Bearing piece 30 comprises a diversion region 32 that can be introduced circumferentially, in the form of a spin conduit, into the inner contour of bearing piece 30. Compressor wheel 16 is then slid onto shaft 15 and secured thereon. Compressor wheel 16 comes to a stop against rotor part 40, and is fastened nondisplaceably both axially and radially with respect to shaft 15.

In an alternative installation method, stator 20 can be preinstalled on shaft 15 and slid as a package into the bearing housing, where stator 20 is then fastened in an axial direction with respect to housing 50.

In an alternative embodiment, bearing piece 30 can be omitted. With this embodiment (not depicted) rotor part 40 does not comprise a deflector 44 for installation reasons. Rotor part 40 can, however, continue to comprise a circumferential seal receptacle 43, for example in the form of a circumferential groove for reception of a sealing ring. The sealing ring then abuts against housing 50 rather than against bearing piece 30.

As is further evident from FIG. 8, a lubricant conduit 53 is recessed into housing 50. Lubricant conduit 53 opens into a distributor space 54 that is shaped in housing 50 circumferentially around center piece 27 of stator 20. Stator 20 possesses passages 25. These create a physical communication between distributor space 54 and a cavity 18 arranged between rotor 10 and stator 20. Cavity 18 leads from passages 25 in an axial direction of shaft 15 to the two bearing segments 12. Cavity 18 is in physical communication with the gap region that is constituted between rotor bearing surfaces 13 and counter-surfaces 21 of bearing segments 12. An operating medium, in particular a lubricant, can correspondingly be delivered via lubricant conduit 53 to the two hydrodynamic plain bearings. When rotor 10 is then rotated relative to stator 20 during operational use, a hydrodynamic pressure buildup occurs in the gap region of the two bearing segments 12. Lubricant is continuously conveyed via lubricant conduit 53 and cavity 18 to bearing segments 12, the lubricant passing through the two hydrodynamic plain bearings. Subsequently to the gap region of the left hydrodynamic plain bearing, the lubricant then travels into the region of rotor part 40 and is then spun radially outward via deflector 44. The lubricant then travels into diversion region 32 of bearing piece 30. The lubricant then runs off in the direction of gravity, and is collected in a cavity 55 of the housing.

In the right-side hydrodynamic plain bearing, subsequently to the gap region of the plain bearing the lubricant is spun radially outward from attachment piece 11. The lubricant travels into the region of a diversion region 56 that is shaped into housing 50. The lubricant then runs off downward in the direction of gravity, and is again collected in cavity 55. Cooling of the housing is achieved with the lubricant, both with diversion region 32 of bearing piece 30 and also, in particular, with diversion region 56 in the region of turbine wheel 14. This represents a considerable additional benefit. In particular, a thermal input occurring during operational use can then be dissipated via the lubricant and kept away from bearing locations 12. The operating reliability of the hydrodynamic plain bearings in high-temperature applications can thereby be guaranteed. The result in particular is to prevent the lubricant from then being exposed to an impermissible temperature stress in the region of bearing segments 12.

In the embodiment in FIG. 8, stator 20 is axially and rotationally fastened by means of a pin 70 engaging into passage 25 of center piece 27. The pin can advantageously be positioned in housing 50 in the oil supply orifice (lubricant supply 35), and engages into passage 25 of stator 20.

The lubricant is collected in cavity 55 and conveyed, optionally via a heat exchanger and a pump, back into lubricant conduit 53.

Figure 9:
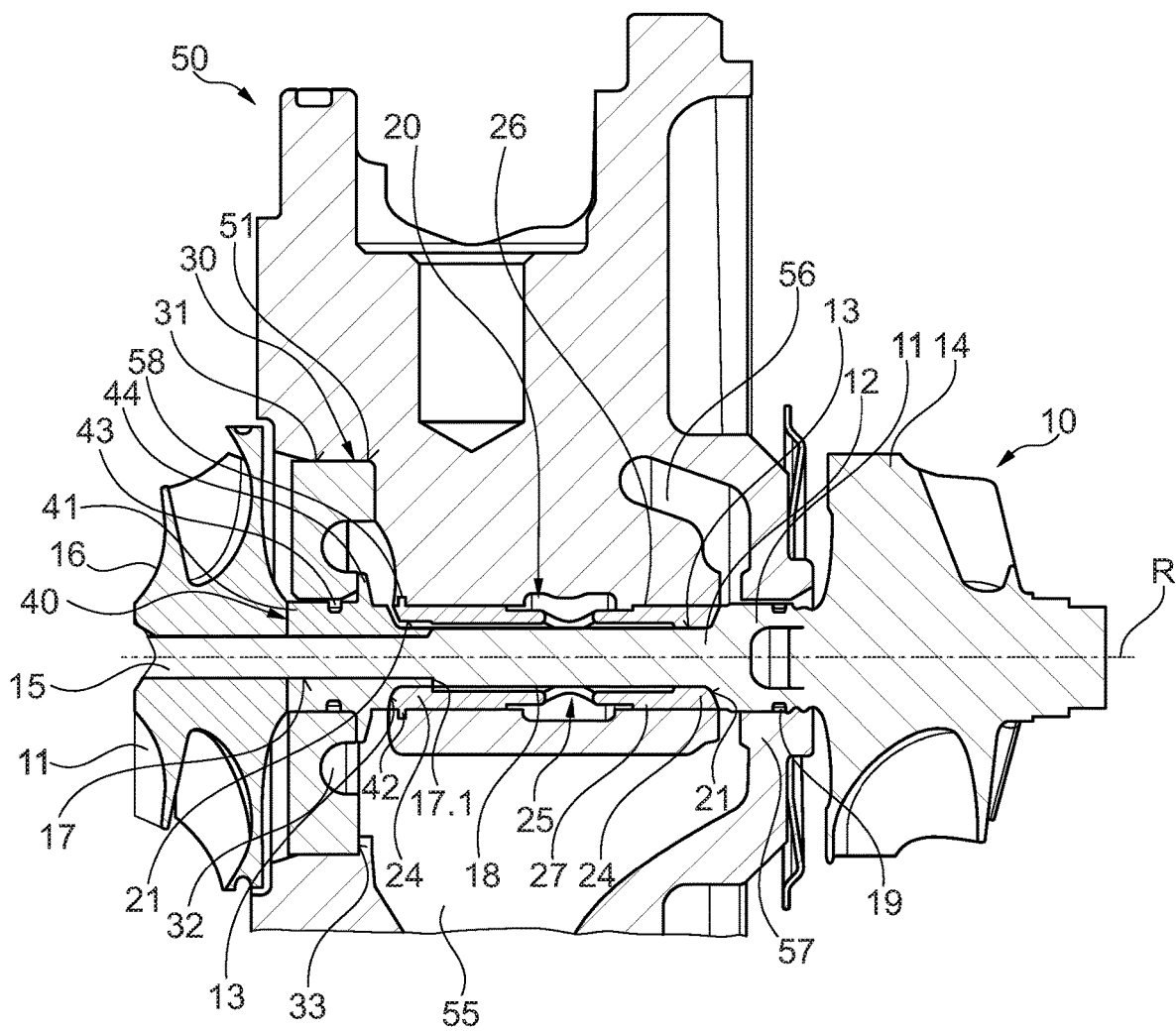

Stator 20 according to FIG. 9 is held in housing 50 with a fastening element 58. Fastening element 58 can be constituted, for example, by a retaining ring, as is evident from FIG. 9.

The technical configuration of the exhaust-gas-driven turbocharger according to FIG. 9 otherwise corresponds to that of FIG. 8, so that reference may be made to the statements above.

Figure 10:
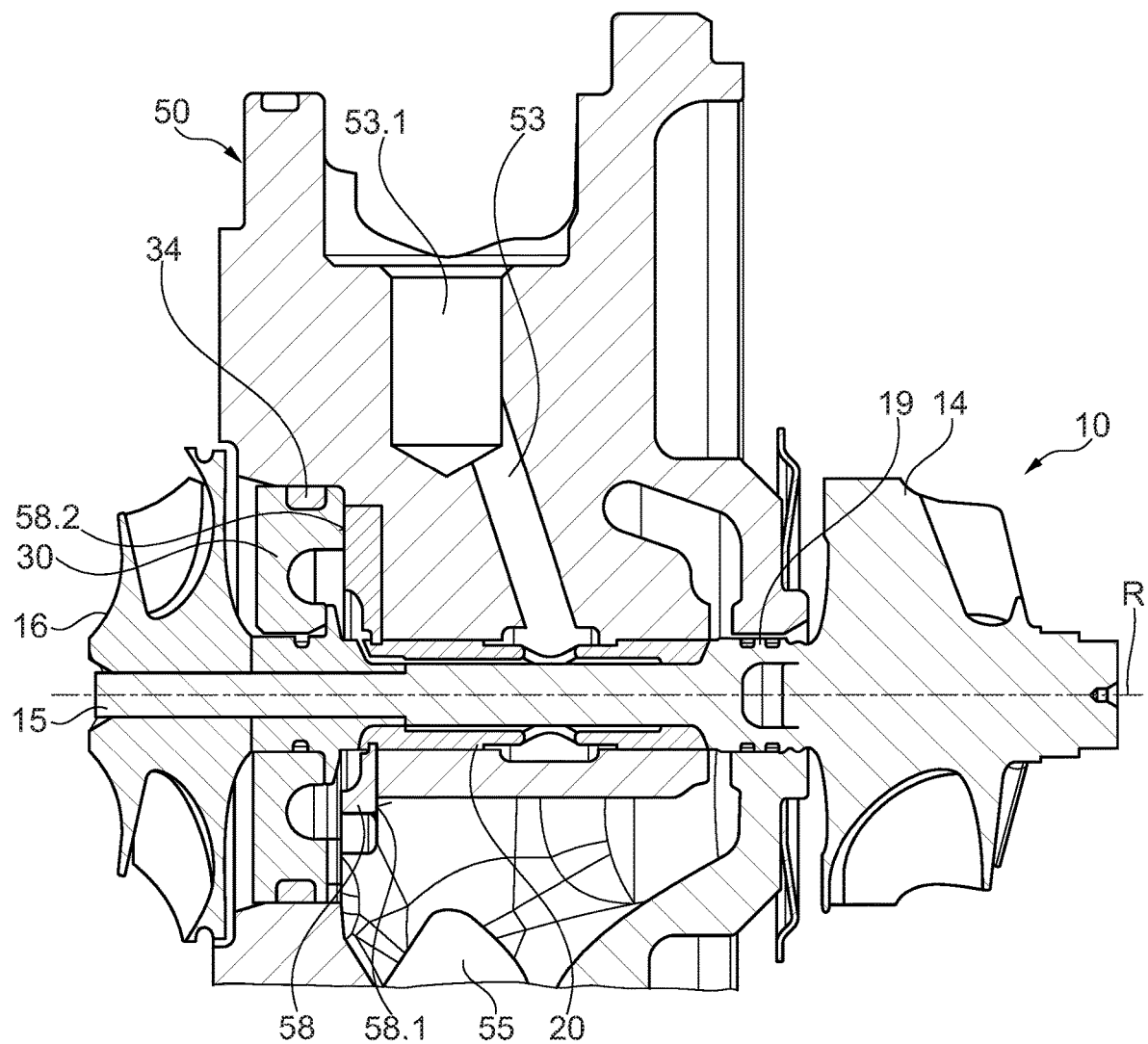

FIG. 10 shows a further variant embodiment of an exhaust-gas-driven turbocharger which corresponds substantially to the conformation in accordance with FIG. 8 and FIG. 9, so that reference may be made to the statements above and only the differences will be discussed.

As is evident from FIG. 10, a double seal having two sealing receptacles 19 is used for an improved sealing effect in the region of supporting segment 57 of housing 50.

Lubricant conduit 53 proceeds from a supply line 53.1 of housing 50, which can be embodied in the form of an attachment thread.

Stator 20 is held by means of a fastening element 58 in both a circumferential direction and an axial direction. Fastening element 58 comprises a base element 58.3 that comprises a seating surface 58.1 and a support surface 58.2. A fastening extension 58.4 is attached to base element 58.3. Fastening extension 58.4 engages into a fastening receptacle of stator 20 in order to secure the latter. Fastening element 58 can be embodied for this purpose in two-part fashion, so that fastening extensions 58.4 can be inserted into the circumferential groove of stator 20. It is also conceivable, however, for fastening extension 58.4 to be mounted, as an elastically deflectable latching element, on the one-piece fastening element 58. Fastening element 58 is embodied in such a way that both axial forces and forces in a circumferential direction can be absorbed in order to immobilize the stator in an axial direction and a circumferential direction.

As is apparent from FIG. 10, fastening element 58 constitutes an extraction contour adjacently to the gap region of the hydrodynamic plain bearing. This contour ensures that lubricant travels via fastening element 58 into diversion region 32 of bearing piece 30.

Lastly, it is apparent from FIG. 10 that bearing piece 30 carries a seal 34 on its outer periphery. Bearing piece 30 can thereby be reliably sealed with respect to housing 50. Fastening element 58 is inserted into a receptacle of housing 50 in such a way that it comes to a stop with its seating surface 58.1 against a counter-surface of housing 50. Seating surface 58.2 serves as an abutment for stop 33 of bearing piece 30.

Figure 11:
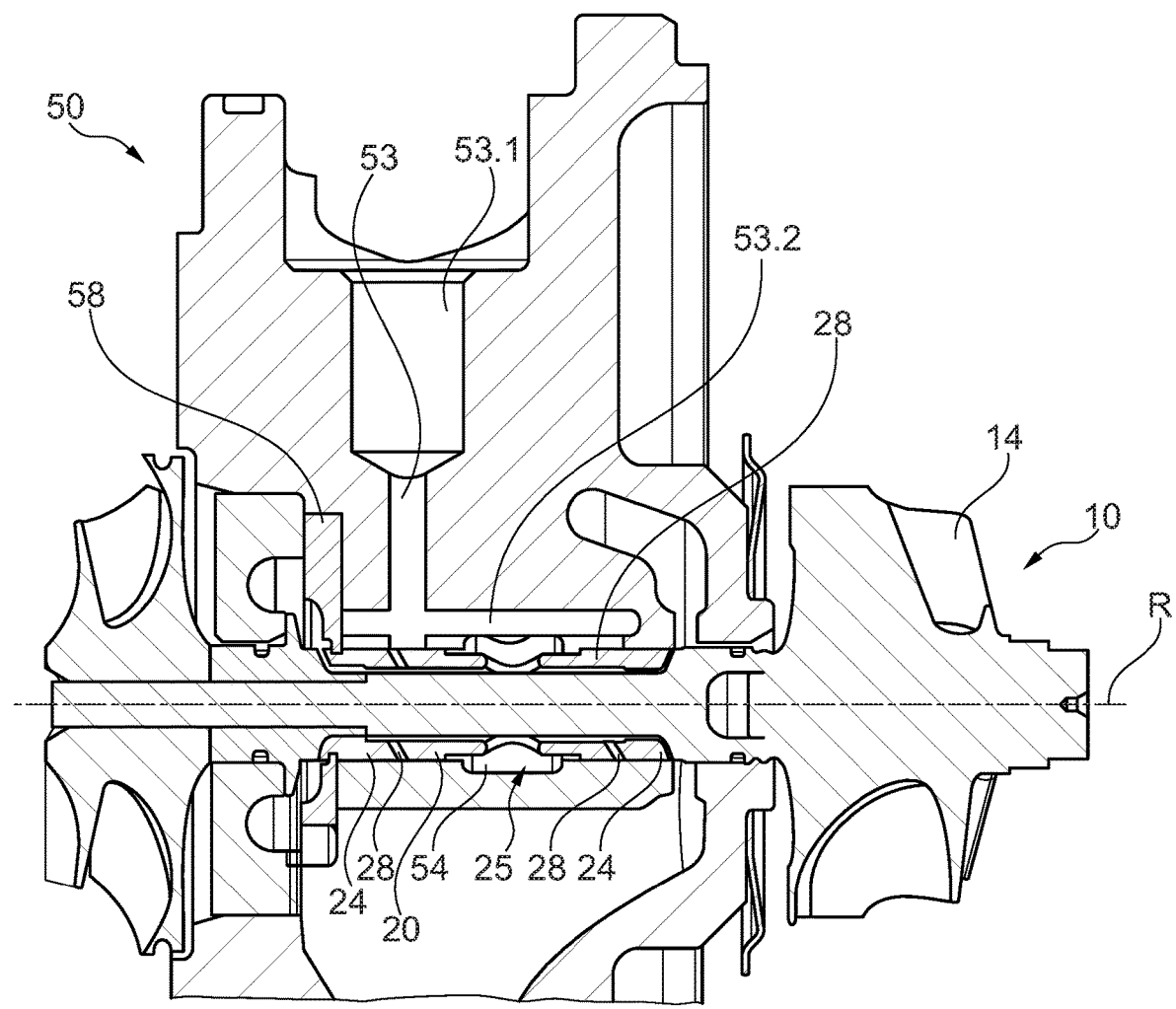

FIG. 11 shows a further variant embodiment of an exhaust-gas-driven turbocharger, the conformation of this exhaust-gas-driven turbocharger corresponding substantially to that of the exhaust-gas-driven turbocharger of FIG. 10, so that reference may be made to the statements above.

In contrast to the exhaust-gas-driven turbocharger according to FIG. 10, the exhaust-gas-driven turbocharger according to FIG. 11 has a modified lubricant supply system. A supply line 53.1 that opens into lubricant conduit 53 is accordingly provided. Lubricant conduit 53 transitions into two supply lines 53.2. Supply lines 53.2 open into infeeds 28 of stator 20. Infeeds 28 are in physical communication with the gap region of the two hydrodynamic plain bearings for lubricant supply purposes.

As has already been mentioned above, stator 20 can be axially and nonrotatably connected in housing 50 in different ways.

Figure 12:
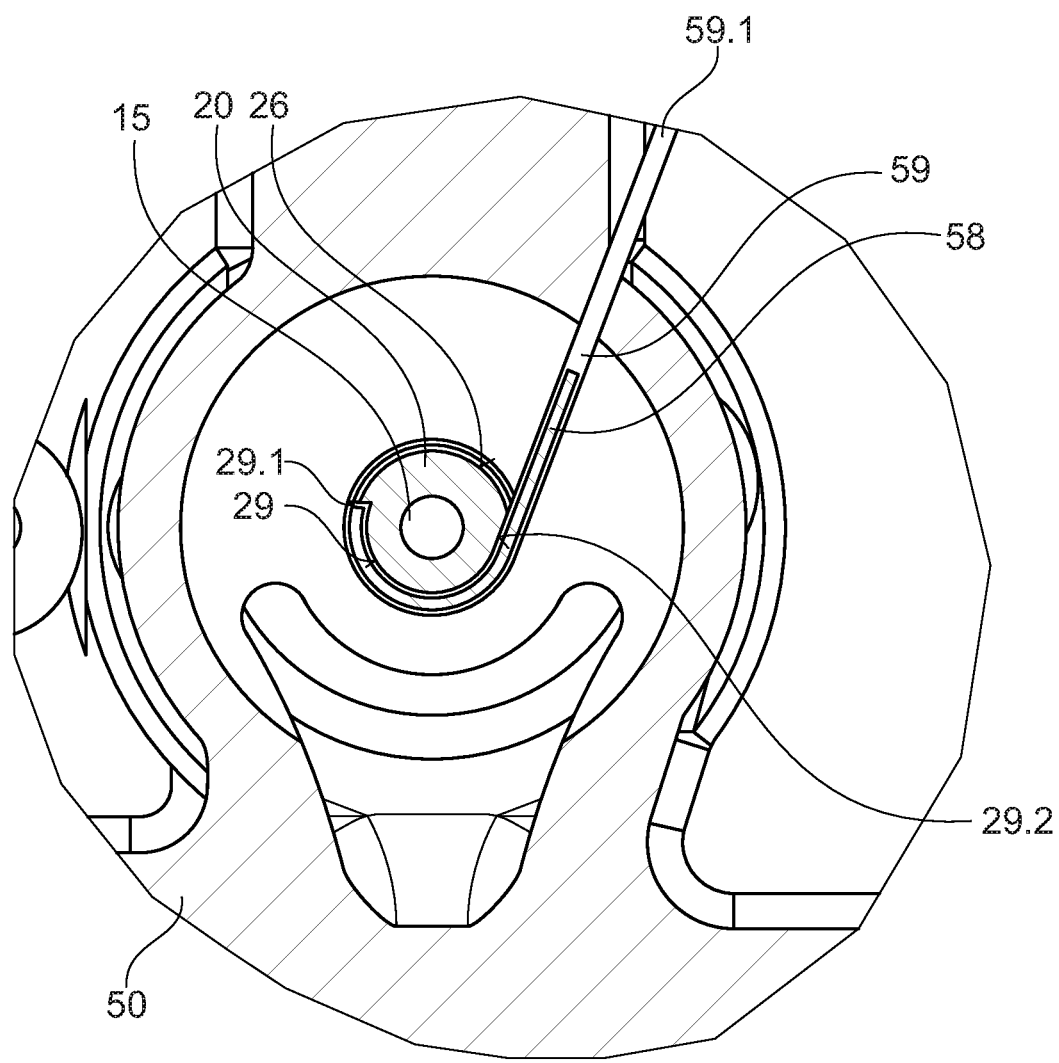
FIGS. 12 and 13 are side views, in section, of two variant technical embodiments for fastening a stator, in particular in a housing of an exhaust-gas-driven turbocharger.
Figure 13:
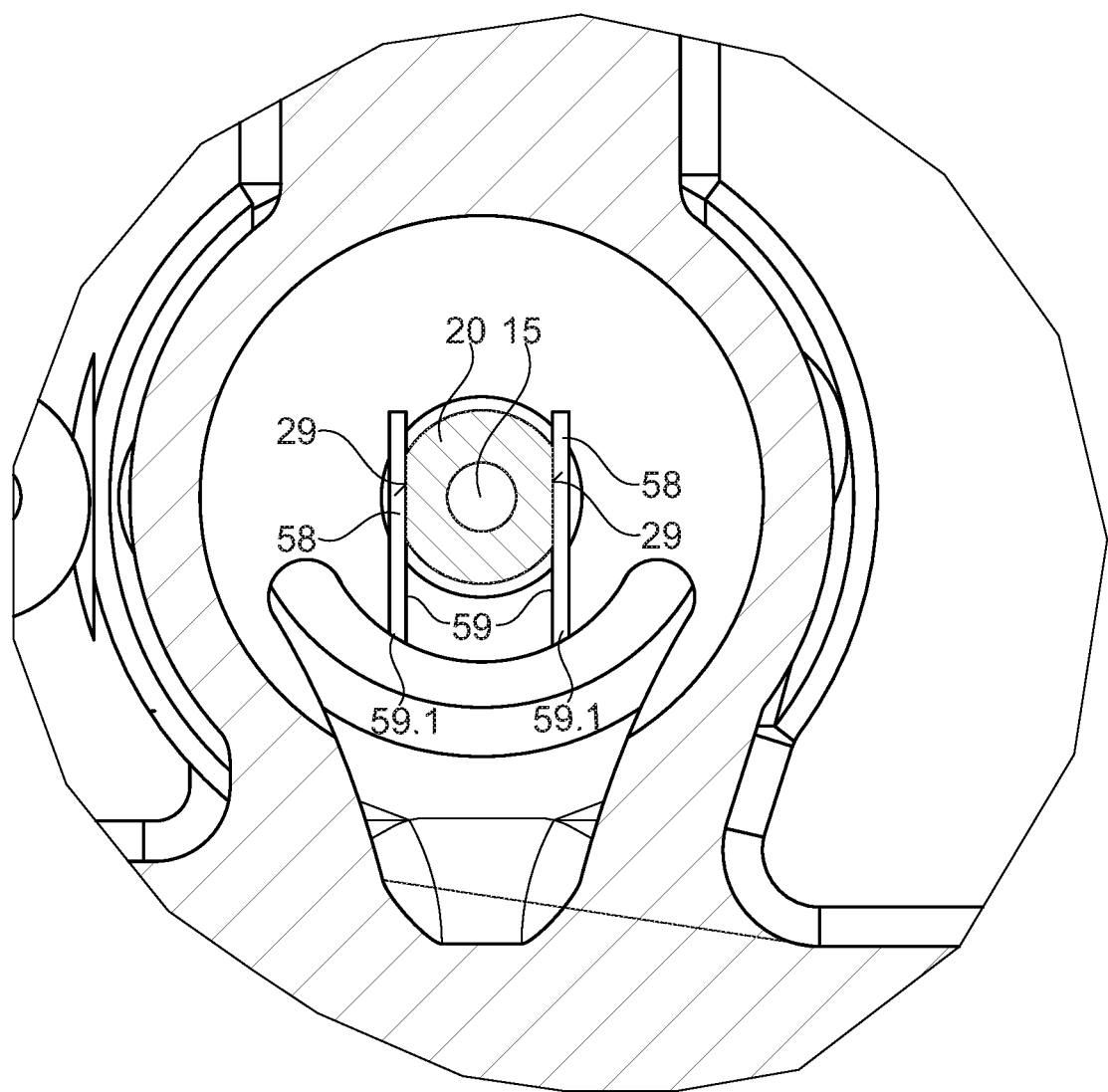

FIGS. 12 and 13 show two further variants for fastening stator 20.

As illustrated by FIG. 12, a guidance conduit 59, which is in communication with the environment via an opening 59, can be introduced into housing 50. Oppositely from opening 59.1, guide 59 opens into a cavity that is constituted between stator 20 and that housing segment of housing 50 which is associated with it. This cavity is constituted by a shoulder in the outer contour of stator 20. A receptacle 29 is correspondingly produced. A fastening element 58 can now be slid through opening 59.1 into guide 59. Fastening element 58 can be constituted by a flexible component, for example a wire segment. Fastening element 58 travels via guide 59 into the region of receptacle 29 and in that context is deformed, preferably plastically, in accordance with the contour of receptacle 29. The inserting motion of fastening element 58 is limited by a stop 29.1 and a stop 29.2 of stator 20. Upon insertion of fastening piece 58, the latter firstly travels into the region of stop 29.1 and rotates stator 20 in the stator receptacle of housing 50 until stop 29.2 is also abutting against fastening element 58, as shown in the drawing. The stator is thereby retained in a circumferential direction. Retention in an axial direction can be accomplished by the fact that receptacle 29 is of groove-shaped configuration, so that stator 20 can no longer deflect in an axial direction with respect to fastening element 58.

FIG. 13 shows a further variant embodiment in which two guides 59 in the form of conduits are introduced into housing 50. Those conduits once again open into receptacles 29. Receptacles 29 are embodied as setbacks in stator 20. Fastening elements 58, for example in the form of wire segments, can once again be introduced into guides 59. Fastening elements 58 abut against shaped bevels, for example flattened areas, of stator 20, and thereby fasten stator 20 in a circumferential direction. Fastening in an axial direction can once again be accomplished by the fact that receptacles 29 are of groove-shaped configuration. Guides 59 are preferably positioned in housing 50 in such a way that fastening elements 58 can be introduced into the guides through an oil discharge orifice (at bottom in FIG. 13). An additional installation orifice can thereby be avoided. Receptacles 29 are preferably positioned centeredly in stator 20. The use of two fastening elements 59 has the advantage that no torque acts on rotor 10 in a context of axial forces, since the forces are absorbed centeredly with respect to rotor 10.

Figure 14:
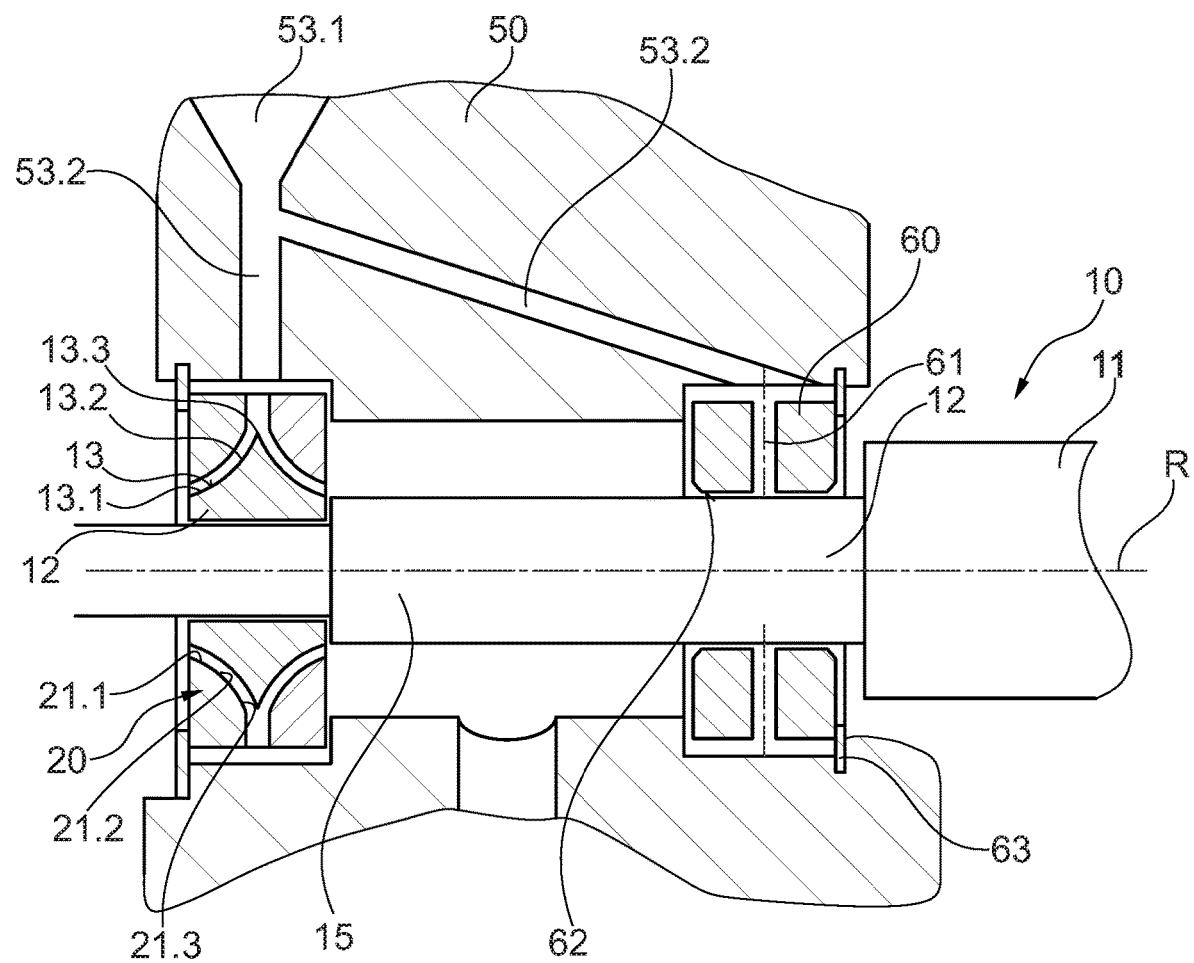
FIG. 14 is a partial section view of a bearing arrangement of an exhaust-gas-driven turbocharger.

FIG. 14 shows a further variant embodiment of a hydrodynamic plain bearing, in particular for use in an exhaust-gas-driven turbocharger. Once again, two hydrodynamic plain bearings, which constitute bearing segments 12, are used. In accordance with the invention, the left-side hydrodynamic plain bearing comprises a rotor bearing surface 13 that is made up of several contour segments 13.1 to 13.4. Stator 20 comprises a counter-surface 21 that likewise comprises several contour segments 21.1 to 21.4. The right-side hydrodynamic plain bearing 60 is embodied as an ordinary radial bearing. An inflow line 53.1 that opens into supply lines 53.2 is introduced into housing 50. Supply lines 53.2 are in physical communication with infeeds 28, 61 of the stators of the hydrodynamic plain bearings in order to achieve lubricant supply in the hydrodynamic gap.

Figure 15:
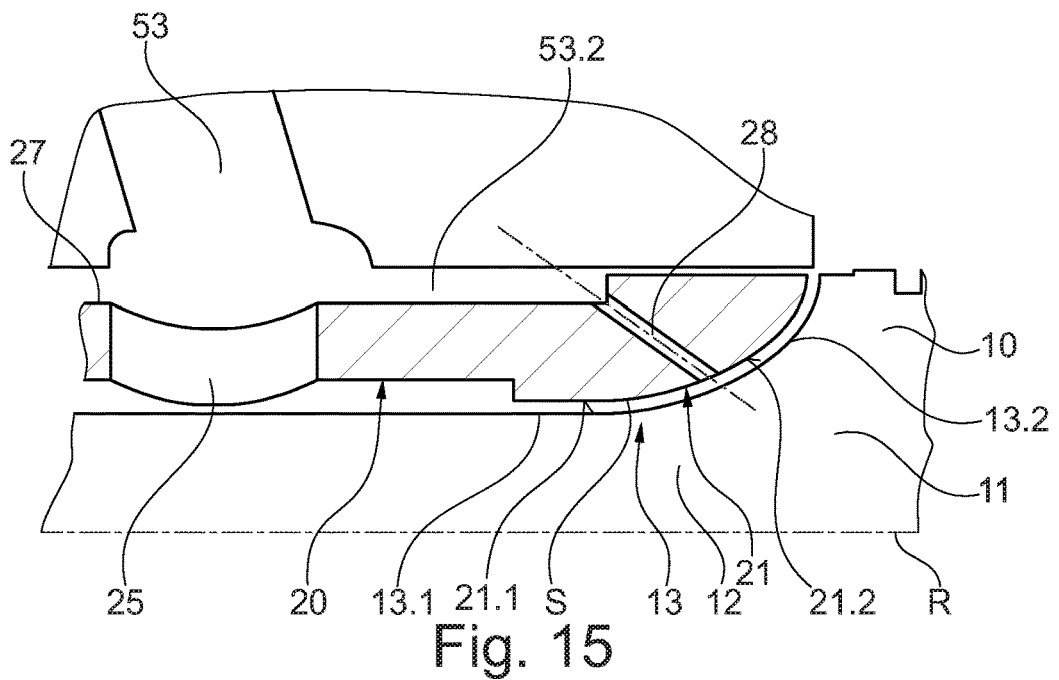
FIGS. 15 to 17 show details of a lubricant supply system for a hydrodynamic plain bearing.
Figure 16:
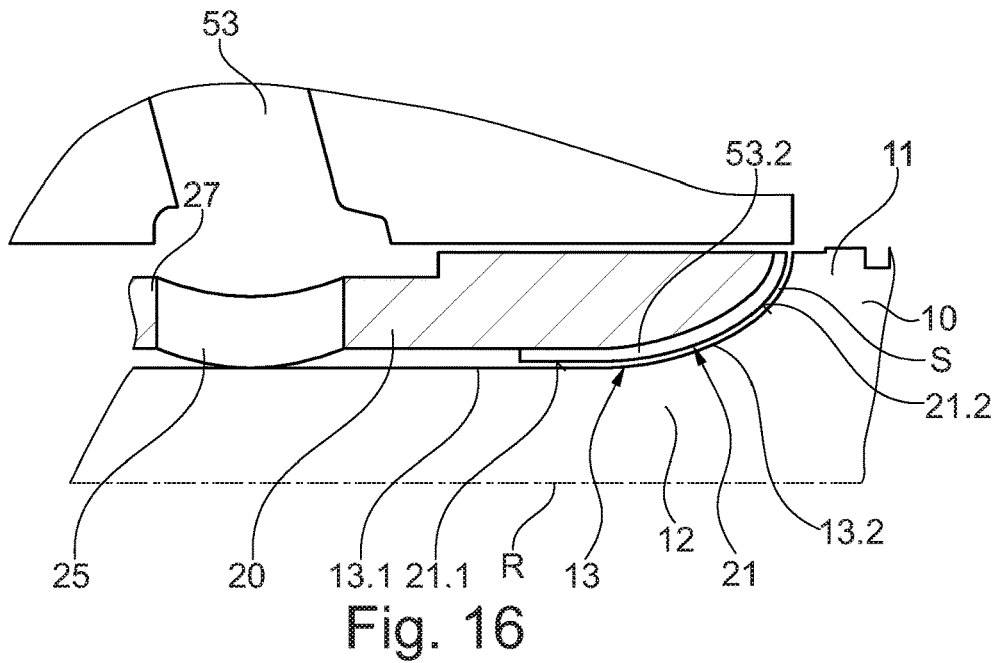
Figure 17:
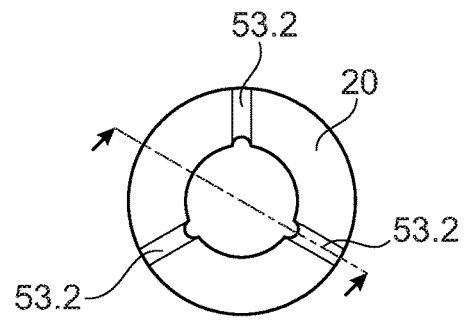

FIGS. 15 to 17 illustrate, in more detail, various variants of hydrodynamic plain bearings in accordance with the invention in an exhaust-gas-driven turbocharger according to FIG. 10. These hydrodynamic plain bearings can of course also be used in other exhaust-gas-driven turbochargers, in particular the other exhaust-gas-driven turbochargers described in the Figures.

As is evident from FIG. 15, stator 20 possesses center piece 27 onto which extension 24 is shaped. Extension 24 constitutes counter-surface 21 having contour segments 21.1, 21.2. A supply line 53.2 is furthermore constituted between stator 20 and housing 50. Supply line 53.2 is constituted by a segment of stator 20 which has a smaller outside diameter than in the region of extensions 24. Supply line 53.2 opens into infeed 28. Infeed 28 in turn is in physical communication with gap region S of the hydrodynamic plain bearing. Oppositely from contour segments 21.1, 21.2, rotor 10 constitutes contour segments 13.1, 13.2. Contour segments 13.1, 13.2, 21.1, 21.2 transition in continuously differentiable fashion into one another. Center piece 27 comprises a passage 25. Stator 20 constitutes, in the transition region to rotor 10, a setback that creates a further supply line 53.3. Lubricant can be delivered from lubricant conduit 53 to gap region S via the two supply lines 53.2, 53.3.

FIG. 16 shows a variant of a lubricant supply system in which a supply line 53.3, which is in physical communication with lubricant conduit 53 (passage 25), is again constituted between rotor 10 and stator 20. Depressions that constitute supply lines 53.2 are introduced into rotor 10 and/or into stator 20. Supply lines are accordingly constituted, partly or entirely, over the entire bearing contour between rotor 10 and stator 20. Lubricant can thus be supplied via lubricant conduit 53, supply line 53.3 directly via supply line 53.2 into gap region S of the hydrodynamic plain bearing. In a further embodiment, depressions 53.2 in stator 20 follow the guidance contour of the bearing system. Depressions 53.2 in stator 20 thus transition without interruption from the radial bearing region into the axial bearing region. The groove contour (curve) is defined as a continuously differentiable function in the effective region.

FIG. 17 shows stator 20 according to FIG. 16 in an end view from the right, the section plane through stator 20 shown in FIG. 15 being indicated.

The invention claimed is:

1. A hydrodynamic plain bearing, comprising:
a rotor including a rotor bearing surface;
a stator including a counter-surface located opposite the rotor bearing surface in order to generate hydrodynamic pressure in a region of a converging gap;
the rotor being rotatable with respect to the stator about a rotation axis;
wherein the rotor bearing surface and the counter-surface each includes in a section view along and through the rotation axis, a continuous bearing contour including at least two contour segments, each contour segment being a straight line or a curvature, the contour segments transitioning into one another directly or indirectly so that each continuous bearing contour generates hydrodynamic pressure along its entire axial length, each continuous bearing contour being configured to generate hydrodynamic load capacities in a radial direction and in an axial direction;
wherein at least one of the rotor bearing surface and the counter-surface includes elevations integral with and projecting from the respective surface.

2. The hydrodynamic plain bearing of claim 1, wherein:
a conformation of the rotor bearing surface deviates from a conformation of the counter-surface of the stator such that the rotor bearing surface and the counter-surface do not abut in planar contact against one another.

3. The hydrodynamic plain bearing of claim 1, wherein:
the rotor bearing surface and the counter-surface comprise a multiple-surface plain bearing.

4. The hydrodynamic plain bearing of claim 1, wherein:
the rotor bearing surface and the counter-surface comprise a floating sleeve bearing.

5. The hydrodynamic plain bearing of claim 1, wherein:
the rotor bearing surface and the counter-surface comprise a cylindrical plain bearing.

6. The hydrodynamic plain bearing of claim 1, wherein:
at least one of the rotor bearing surface and the counter-surface includes regions having different coefficients of thermal expansion.

7. The hydrodynamic plain bearing of claim 1, wherein:
at least one of the rotor bearing surface and the counter-surface includes regions having different moduli of elasticity.

8. The hydrodynamic plain bearing of claim 1, wherein:
the rotor bearing surface is defined at least partly on a rotor part connected nonrotatably to the rotor.

9. The hydrodynamic plain bearing of claim 1, in combination with a second bearing spaced from the hydrodynamic plain bearing along the rotor axis.

10. The combination hydrodynamic plain bearing and second bearing of claim 9, wherein:
the second bearing is a hydrodynamic radial bearing.

11. A hydrodynamic plain bearing, comprising:
a rotor including a rotor bearing surface;
a stator including a counter-surface located opposite the rotor bearing surface in order to generate hydrodynamic pressure in a region of a converging gap;
the rotor being rotatable with respect to the stator about a rotation axis;
wherein the rotor bearing surface and the counter-surface each includes in a section view along and through the rotation axis, a continuous bearing contour including at least two contour segments, each contour segment being a straight line or a curvature, the contour segments transitioning into one another directly or indirectly so that each continuous bearing contour generates hydrodynamic pressure along its entire axial length, each continuous bearing contour being configured to generate hydrodynamic load capacities in a radial direction and in an axial direction;
wherein at least one of the rotor bearing surface and the counter-surface includes regions having different coefficients of thermal expansion; and
wherein one of the regions having different coefficients of thermal expansion is made of ceramic oxide.

12. A hydrodynamic plain bearing, comprising:
a rotor including a rotor bearing surface;
a stator including a counter-surface located opposite the rotor bearing surface in order to generate hydrodynamic pressure in a region of a converging gap;
the rotor being rotatable with respect to the stator about a rotation axis;
wherein the rotor bearing surface and the counter-surface each includes in a section view along and through the rotation axis, a continuous bearing contour including at least two contour segments, each contour segment being a straight line or a curvature, the contour segments transitioning into one another directly or indirectly so that each continuous bearing contour generates hydrodynamic pressure along its entire axial length, each continuous bearing contour being configured to generate hydrodynamic load capacities in a radial direction and in an axial direction;

wherein each continuous bearing contour includes one or more further contour segments arranged axially between the at least two bearing contour segments.

13. A hydrodynamic plain bearing, comprising:

a rotor including a rotor bearing surface;

a stator including a counter-surface located opposite the rotor bearing surface in order to generate hydrodynamic pressure in a region of a converging gap;

the rotor being rotatable with respect to the stator about a rotation axis;

wherein the rotor bearing surface and the counter-surface each includes in a section view along and through the rotation axis, a continuous bearing contour including at least two contour segments, each contour segment being a straight line or a curvature, the contour segments transitioning into one another directly or indirectly so that each continuous bearing contour generates hydrodynamic pressure along its entire axial length, each continuous bearing contour being configured to generate hydrodynamic load capacities in a radial direction and in an axial direction;

wherein the at least two contour segments of each continuous bearing contour include at least one convex contour segment and at least one concave contour segment, the at least one convex contour segment transitioning into the at least one concave contour segment directly or indirectly via a further contour segment.

14. A hydrodynamic plain bearing, comprising:

a rotor including a rotor bearing surface;

a stator including a counter-surface located opposite the rotor bearing surface in order to generate hydrodynamic pressure in a region of a converging gap;

the rotor being rotatable with respect to the stator about a rotation axis;

wherein the rotor bearing surface and the counter-surface each includes in a section view along and through the rotation axis, a continuous bearing contour including at least two contour segments, each contour segment being a straight line or a curvature, the contour segments transitioning into one another directly or indirectly so that each continuous bearing contour generates hydrodynamic pressure along its entire axial length, each continuous bearing contour being configured to generate hydrodynamic load capacities in a radial direction and in an axial direction;

wherein the rotor includes a deflector arranged in a region of a lubricant outlet of the plain bearing.

15. A hydrodynamic plain bearing, comprising:

a rotor including a rotor bearing surface;

a stator including a counter-surface located opposite the rotor bearing surface in order to generate hydrodynamic pressure in a region of a converging gap;

the rotor being rotatable with respect to the stator about a rotation axis;

a lubricant supply system including a lubricant conduit configured to convey lubricant through a supply line to the converging gap; and wherein the rotor bearing surface and the counter-surface each includes in a section view along and through the rotation axis, a continuous bearing contour including at least two contour segments, each contour segment being a straight line or a curvature, the contour segments transitioning into one another directly or indirectly so that each continuous bearing contour generates hydrodynamic pressure along its entire axial length, each continuous bearing contour being configured to generate hydrodynamic load capacities in a radial direction and in an axial direction.

16. The hydrodynamic plain bearing of claim 15, wherein:

the supply line is defined by a groove in the stator.

17. A combination hydrodynamic plain bearing and second bearing, comprising:

a hydrodynamic plain bearing, including:

a rotor including a rotor bearing surface;

a stator including a counter-surface located opposite the rotor bearing surface in order to generate hydrodynamic pressure in a region of a converging gap;

the rotor being rotatable with respect to the stator about a rotation axis;

wherein the rotor bearing surface and the counter-surface each includes in a section view along and through the rotation axis, a continuous bearing contour including at least two contour segments, each contour segment being a straight line or a curvature, the contour segments transitioning into one another directly or indirectly so that each continuous bearing contour generates hydrodynamic pressure along its entire axial length, each continuous bearing contour being configured to generate hydrodynamic load capacities in a radial direction and in an axial direction;

a second bearing spaced from the hydrodynamic plain bearing along the rotor axis;

wherein the hydrodynamic plain bearing is a first hydrodynamic plain bearing;

wherein the second bearing is a second hydrodynamic plain bearing having a second rotor bearing surface defined on the rotor and a second counter-surface defined on the stator; and wherein the stator is defined on a housing insert, and the counter-surfaces of the first and second hydrodynamic plain bearings are defined on the housing insert and are spaced apart along the rotor axis.

18. The combination hydrodynamic plain bearing and second bearing of claim 17, wherein:

the second counter-surface includes in a section view along and through the rotation axis a continuous bearing contour including at least two contour segments; and the housing insert includes two extensions connected via a centerpiece, the contour segments of each of the counter-surfaces of the first and second hydrodynamic plain bearings being defined on the two extensions.

19. The combination hydrodynamic plain bearing and second bearing of claim 17, in further combination with an exhaust-gas-driven turbocharger, the stator being a stator of the exhaust-gas-driven turbocharger, and further comprising a fastening element configured to secure the housing insert in the housing.

20. A combination hydrodynamic plain bearing and second bearing, comprising:

a hydrodynamic plain bearing, including:

a rotor including a rotor bearing surface;

a stator including a counter-surface located opposite the rotor bearing surface in order to generate hydrodynamic pressure in a region of a converging gap;

the rotor being rotatable with respect to the stator about a rotation axis;

wherein the rotor bearing surface and the countersurface each includes in a section view along and through the rotation axis, a continuous bearing contour including at least two contour segments, each contour segment being a straight line or a curvature, the contour segments transitioning into one another directly or indirectly so that each continuous bearing contour generates hydrodynamic pressure along its entire axial length, each continuous bearing contour being configured to generate hydrodynamic load capacities in a radial direction and in an axial direction;

a second bearing spaced from the hydrodynamic plain bearing along the rotor axis; and a lubricant supply system configured to supply lubricant simultaneously to both the hydrodynamic plain bearing and the second bearing.

* * * * *